US011022795B2

(12) United States Patent
Ogawa (10) Patent No.: US 11,022,795 B2
(45) Date of Patent: Jun. 1, 2021

(54) VEHICLE DISPLAY CONTROL DEVICE (71) Applicant: DENSO CORPORATION, Kariya (JP)

(72) Inventor: Hiroaki Ogawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/532,916

(22) Filed: Aug. 6, 2019

(65) Prior Publication Data

US 2019/0361233 A1 Nov. 28, 2019

Related U.S. Application Data (63) Continuation of application No. PCT/JP2017/046326, filed on Dec. 25, 2017.

(30) Foreign Application Priority Data

Feb. 8, 2017 (JP) .............................. JP2017-021508

(51) Int. Cl.
*G06T 7/70* (2017.01)
*G02B 27/01* (2006.01)
*B60K 35/00* (2006.01)
*G06F 3/01* (2006.01)
*G06K 9/00* (2006.01)
*G09G 5/10* (2006.01)

(52) U.S. Cl.
CPC .......... *G02B 27/0101* (2013.01); *B60K 35/00* (2013.01); *G06F 3/013* (2013.01); *G06K 9/00805* (2013.01); *G06T 7/70* (2017.01); *G09G 5/10* (2013.01); *B60K 2370/1529* (2019.05); *B60K 2370/31* (2019.05); *B60K 2370/334* (2019.05); *B60K 2370/349* (2019.05); *B60K 2370/52* (2019.05); *G02B 2027/014* (2013.01); *G02B 2027/0118* (2013.01); *G06T 2207/30201* (2013.01); *G06T 2207/30268* (2013.01); *G09G 2320/0626* (2013.01)

(58) Field of Classification Search
CPC ... G06T 7/70; G06K 9/00845; G06K 9/00604
USPC ........................................................ 345/589
See application file for complete search history.

(56) References Cited

U.S. PATENT DOCUMENTS

| 2011/0102483 | A1 | 5/2011 | Kanamori |
| 2015/0130687 | A1 | 5/2015 | Kitamura et al. |
| 2016/0009175 | A1* | 1/2016 | McNew ............ G01C 21/3652 340/438 |

(Continued)

FOREIGN PATENT DOCUMENTS

| JP | H11-67464 A | 3/1999 |
| JP | 2007-050757 A | 3/2007 |

(Continued)

*Primary Examiner* — Thomas J Lett
(74) *Attorney, Agent, or Firm* — Maschoff Brennan (57) ABSTRACT

A vehicle display control device, which adjusts a brightness of a display image as a display image brightness of a head-up display that superimposes and displays the display image as a virtual image over a foreground scenery of the vehicle by projecting the display image onto a projection member, includes: a visual line position specifying unit that specifies a visual line position of the driver of the vehicle; and a display control unit that adjusts the display image brightness according to the brightness in a set range of the foreground scenery with respect to the visual line position as a reference point.

20 Claims, 7 Drawing Sheets

(56) References Cited

U.S. PATENT DOCUMENTS

| | | | |
|---|---|---|---|
| 2016/0148065 A1* | 5/2016 | Lee | H04N 5/23219 348/78 |
| 2016/0154238 A1 | 6/2016 | Weindorf et al. | |
| 2016/0157324 A1 | 6/2016 | Weindorf et al. | |
| 2017/0116952 A1* | 4/2017 | Wang | G09G 5/006 |
| 2019/0248288 A1* | 8/2019 | Oba | G06T 3/00 |

FOREIGN PATENT DOCUMENTS

| | | |
|---|---|---|
| JP | 2011-098634 A | 5/2011 |
| JP | 2012-066646 A | 4/2012 |
| JP | 2014-019372 A | 2/2014 |
| JP | 2016-097818 A | 5/2016 |
| JP | 2016-110142 A | 6/2016 |

* cited by examiner

VEHICLE DISPLAY CONTROL DEVICE

CROSS REFERENCE TO RELATED APPLICATION

The present application is a continuation application of International Patent Application No. PCT/JP2017/046326 filed on Dec. 25, 2017, which designated the U.S. and claims the benefit of priority from Japanese Patent Application No. 2017-021508 filed on Feb. 8, 2017. The entire disclosures of all of the above applications are incorporated herein by reference.

TECHNICAL FIELD

The present disclosure relates to a vehicle display control device.

BACKGROUND

Conventionally, there is known a technique for controlling a virtual image display by a head-up display (hereinafter, HUD) that superimposes a virtual image on a front scenery of a vehicle by projecting an image onto a projection member such as a windshield. As a technique for controlling the virtual image display, there is known a technique for adjusting the brightness of the image projected onto the projection member, that is, the brightness of the virtual image display. For example, a technique is provided to adjust the virtual image display luminance in accordance with the output of a front monitoring light sensor that detects light emitted from a street lamp in front of the vehicle or the sun.

SUMMARY

According to an example embodiment, a vehicle display control device, which adjusts a brightness of a display image as a display image brightness of a head-up display that superimposes and displays the display image as a virtual image over a foreground scenery of the vehicle by projecting the display image onto a projection member, includes: a visual line position specifying unit that specifies a visual line position of the driver of the vehicle; and a display control unit that adjusts the display image brightness according to the brightness in a set range of the foreground scenery with respect to the visual line position as a reference point.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

In a comparison technique, since it is not considered to include a viewpoint which range of the front scenery the virtual image display luminance is adjusted according to the brightness, the driver may not have easily visual contact with the virtual image display. The details are described as follows.

For example, when the virtual image display luminance is increased according to the strong brightness of a place where does not fall within the view range of the driver, there may be a possibility that it is difficult for the driver to see the virtual image display because the virtual image display luminance is too bright for the driver. On the other hand, when the virtual image display brightness is reduced according to the brightness in a range which does not include the strong brightness of the place in the view range of the driver, there may be a possibility that it is difficult for the driver to see the virtual image display because the virtual image display luminance is too dark for the driver.

According to an example embodiment, a vehicle display control device displays a virtual image display by a head-up display to be more easily visible for a driver.

According to an example embodiment, a vehicle display control device, which adjusts a brightness of a display image as a display image brightness by a head-up display that superimposes and displays the display image as a virtual image over a front scenery of the vehicle by projecting the display image onto a projection member, includes: a visual line position specifying unit that specifies a visual line position of the driver of the vehicle; and a display control unit that adjusts the display image brightness according to the brightness in a predetermined range of the front scenery with respect to the visual line position as a reference point.

According to the vehicle display control device, the display image brightness of the display image to be superimposed and displayed as the virtual image on the front scenery of the vehicle by the head-up display is adjustable according to the brightness in the predetermined range of the front scenery with respect to the visual line position of the driver. Since the predetermined range with respect to the visual line position of the driver as the reference point may be a range depending on the visual range of the driver since the visual line position of the driver is the reference point. Therefore, it is possible to adjust the display image brightness based on the brightness in the range of the front scenery according to the visual range of the driver. As a result, the virtual image display by the head-up display is displayed more easily visible for the driver.

A plurality of embodiments and a plurality of modifications for disclosure will be described with reference to the drawings. For convenience of explanation, the same reference numerals are assigned to portions having the same functions as those illustrated in the drawings used in the description so far among the plurality of embodiments and the plurality of modifications, and the description of the portions may be omitted. Description of the portions assigned the same reference numbers may be referred to the explanation in other embodiments or other modifications.

First Embodiment

Schematic Configuration of Vehicle System 1

Figure 1:
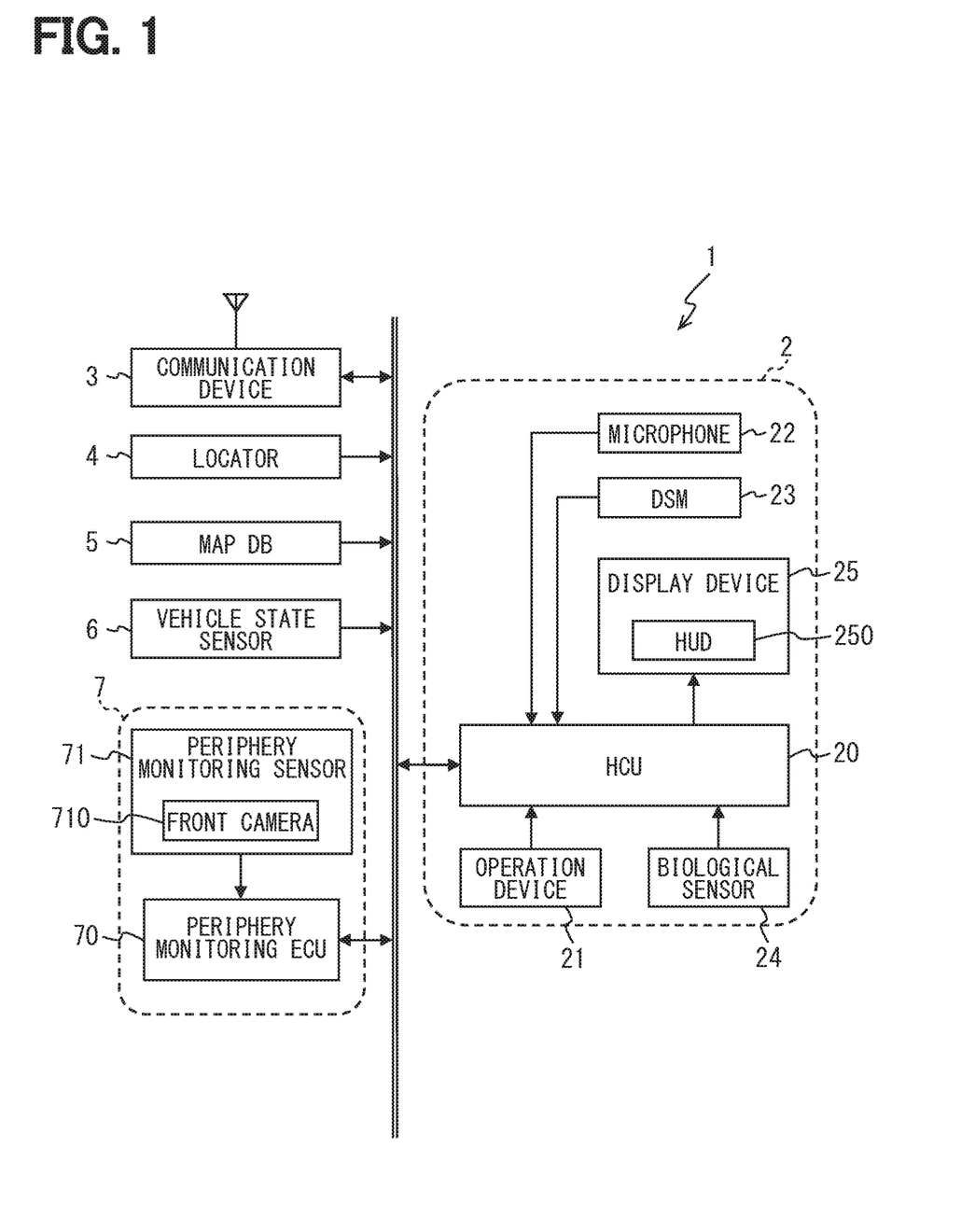
FIG. 1 is a diagram showing an example of a schematic configuration of a vehicle system 1.

Hereinafter, the present embodiment will be described with reference to the drawings. A vehicle system 1 shown in FIG. 1 is used in a vehicle such as an automobile, and includes an HMI (Human Machine Interface) system 2, a communication device 3, a locator 4, a map database (hereinafter, referred to as a map DB) 5, a vehicle state sensor 6, and a periphery monitoring system 7. The HMI system 2, the communication device 3, the locator 4, the map DB 5, the vehicle state sensor 6, and the periphery monitoring system 7 are connected to, for example, an in-vehicle LAN. Hereinafter, the vehicle mounting the vehicle system 1 will be referred to as a host vehicle.

The communication device 3 communicates with the center. The communication device 3 may communicate with the center using a communication module for performing communication via a public communication network such as a cellular phone network or the Internet. For example, the communication device 3 may communicate with the center via a communication network for a telematics using a vehicle communication module
for telematics communication such as DCM (Data Communication Module). For example, the communication device 3 downloads traffic information including traffic jam information from the traffic information center. The communication device 3 may communicate with the center via a roadside device.

The locator 4 includes a GNSS (Global Navigation Satellite System) receiver and an inertial sensor. The GNSS receiver receives positioning signals from multiple artificial satellites. The inertial sensor includes, for example, a three-axis gyro sensor and a three-axis acceleration sensor. The locator 4 combines the positioning signals received by the GNSS receiver with the measurement results of the inertial sensors to sequentially detect the vehicle position of the host vehicle on which the locator 4 is mounted. The vehicle position may be measured using a travel distance obtained from signals sequentially output from a vehicle speed sensor mounted on the host vehicle.

The map DB 5 is a nonvolatile memory, and stores map data such as link data, node data, road shape, structures and the like. The link data includes various pieces of data such as an link ID identifying a link, a link length indicating a length of the link, a link azimuth, a link travel time, link shape information, node coordinates (latitude/longitude) of a start point and an end point of the link, and road attributes. The node data includes a various pieces of data such as a node ID in which a unique number is assigned to each node on a map, node coordinates, a node name, a node type, a connection link ID in which a link ID of a link connected to the node is described, an intersection type, and the like. The road shape data includes the longitudinal slope of the link. The data of the structure is data of a road structure such as a tunnel and a structure such as a building facing the road.

The vehicle state sensor 6 is a sensor group for detecting a traveling state of the host vehicle. The vehicle state sensor 6 includes a vehicle speed sensor that detects the vehicle speed of the host vehicle, a steering angle sensor that detects the steering angle of the host vehicle, and the like. The vehicle state sensor 6 outputs the detection result to the in-vehicle LAN. The detection result from the vehicle state sensor 6 may be output to the vehicle LAN through an ECU mounted on the host vehicle.

The periphery monitoring system 7 includes a periphery monitoring ECU 70 and a periphery monitoring sensor 71. The periphery monitoring system 7 recognizes a traveling environment of the host vehicle. The periphery monitoring sensor 71 detects an obstacle such as a stationary object or a moving object around the host vehicle, or detects a road sign such as a regulation marking, an indication marking, or a traveling lane line. The periphery monitoring sensor 71 may be configured by a front camera 710 having a predetermined range in front of the host vehicle as an imaging range. For example, the front camera 710 may be arranged in the rearview mirror 11 (see FIG. 2) of the host vehicle. The front camera 710 may be arranged on the upper surface of the instrument panel 12 (see FIG. 2) of the host vehicle. The periphery monitoring sensor 71 may be configured by cameras for capturing images other than the front scenery of the host vehicle, or may be configured by a millimeter wave radar, a sonar, a LIDAR (Light Detection and Ranging/Laser Imaging Detection and Ranging) or the like.

The periphery monitoring ECU 70 is mainly configured of a microcomputer including a processor, a volatile memory, a nonvolatile memory, an I/O, and a bus connecting these elements, and executing various control programs stored in the nonvolatile memory to perform various processes. The periphery monitoring ECU 70 recognizes the traveling environments of the host vehicle based on the detection result by the periphery monitoring sensor 71. For example, the distance from the host vehicle, the relative position to the host vehicle, the relative speed to the host vehicle, and the like with regard to the object existing around the vehicle are detected based on the data of the captured image acquired from the periphery monitoring sensor 71. As an example, mobile objects such as vehicles, bicycles, and motorcycles, pedestrians, and the like may be targets of detection by a conventional image recognition process such as a template matching process.

The HMI system 2 includes an HCU (Human Machine Interface Control Unit) 20, an operation device 21, a microphone 22, a DSM (Driver Status Monitor) 23, a biological sensor 24, and a display device 25, and receives an input operation from the driver of the host vehicle, monitors the state of the driver of the host vehicle and the like, and presents information to the driver of the host vehicle.

The operation device 21 is a switch group operated by the driver of the host vehicle. The operation device 21 is used to perform various settings. For example, the operation device 21 may be configured by a steering switch or the like arranged in a spoke portion of a steering wheel of the host vehicle. The microphone 22 is a sound collecting device arranged in the passenger compartment of the vehicle. The microphone 22 picks up a sound output from a passenger such as a driver of the host vehicle, a sound of a car radio, a sound of a siren of an emergency vehicle transmitted from the outside of the vehicle and the like, converts the sound into an electric sound signal, and outputs the signal to the HCU 20. The microphone 22 may be arranged, for example, near the driver's seat.

The DSM 23 is configured by a near infrared light source and a near infrared camera together with a control unit for controlling these elements and the like. The DSM 23 is disposed, for example, on the steering column cover, the upper surface of the instrument panel 12 (see FIG. 2) or the like in a positional manner such that the near infrared camera is directed to the driver's seat side of the host vehicle. The DSM 23 captures the head of the driver irradiated with near infrared light by the near infrared light source using a near infrared camera. The image captured by the near infrared camera is analyzed by the control unit. The control unit detects, for example, the face orientation and/or the visual line direction of the driver based on the captured image.

As an example, the DSM 23 detects an outline of a face and a part of the face such as eyes, a nose, a mouth, and the like by an image recognition process based on a captured image obtained by capturing the face of the driver with a near infrared camera. Then, the face orientation of the driver is detected from the relative positional relationship of each part. Also, as an example, the DSM 23 detects the driver's pupil and corneal reflection from the captured image obtained by capturing the driver's face with a near infrared camera and by performing the image recognition process, and detects the visual line direction with respect to the reference position in the passenger compartment based on the positional relationship between the detected pupil and detected corneal reflection. The reference position may be, for example, the installation position of the near infrared camera. The visual line direction may be detected in consideration of the face direction. The DSM 23 outputs information of the detected visual line direction to the HCU 20.

The biological sensor 24 is a sensor that detects the biological information of the driver. The biological information detected by the biological sensor 24 includes a heart rate, body temperature, blood pressure, a respiratory rate and the like. The biological sensor 24 may be arranged on, for example, a steering wheel, a driver's seat or the like to detect biological information of the driver. Here, the biological sensor 24 may be arranged not only in the host vehicle but also on a wearable device which a driver wears. In this case, the HCU 20 may acquire the detection result of the biological sensor 24 through wireless communication, for example.

Figure 2:
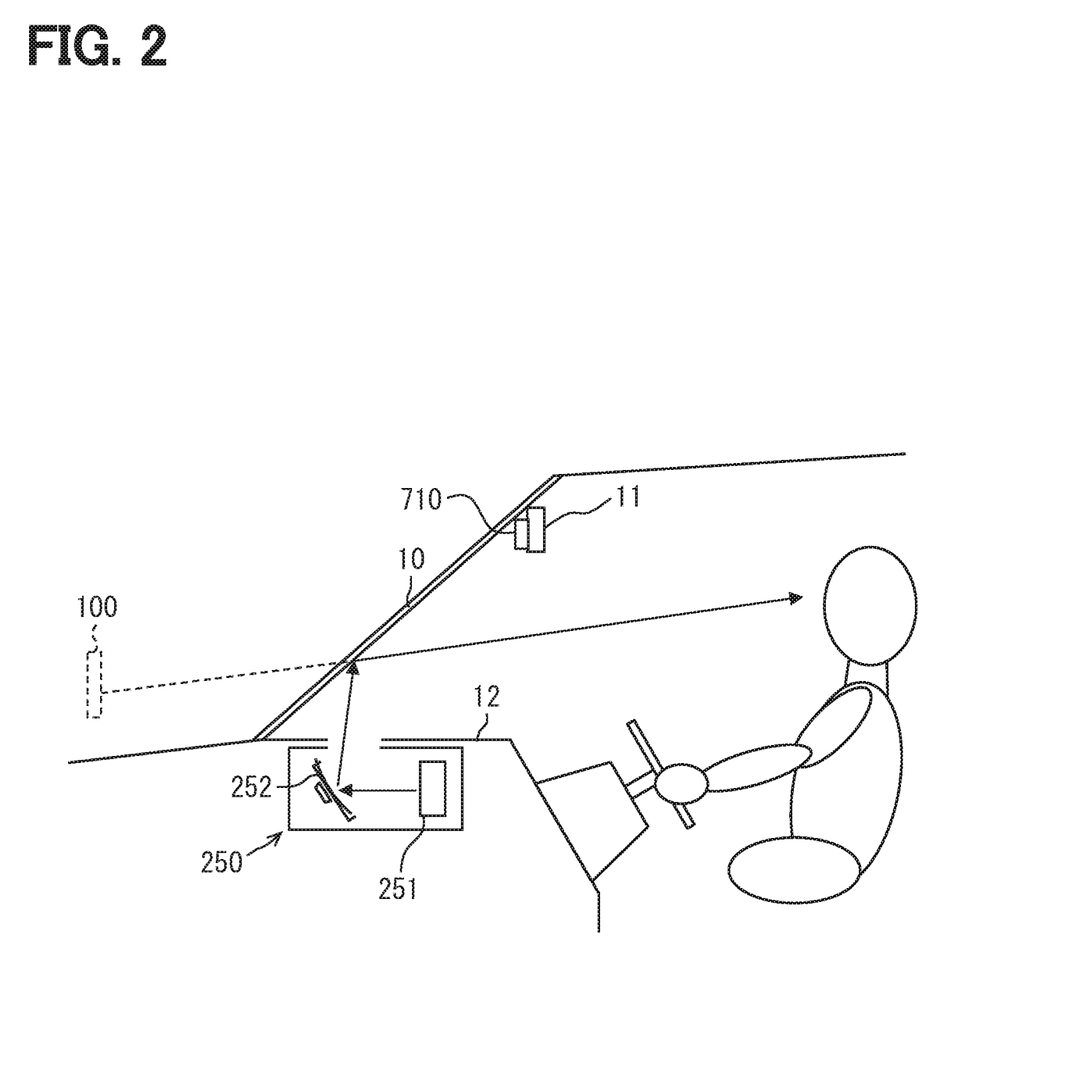
FIG. 2 is a diagram showing an example in which an HUD is mounted on a vehicle.

A head-up display (HUD) 250 is used as the display device 25. Here, the HUD 250 will be described with reference to FIG. 2. As shown in FIG. 2, the HUD 231 is arranged on an instrument panel 11 of the host vehicle. The HUD 250 forms a display image based on the image data output from the HCU 20 using, for example, a liquid crystal type or scanning type projector 251. As the display image, for example, there is an image showing the vehicle state such as the vehicle speed. Also, there are an image indicating the schedule route of the host vehicle, an image indicating an information source such as a road sign and a road marking, and the like. Note that an image indicating information other than the above listed information may be used.

The HUD 250 projects the display image formed by the projector 251 onto a projection area defined on the front windshield 10 as a projection member through an optical system 222 such as a concave mirror. The projection area is located, for example, in front of the driver's seat. A light beam of the display image reflected by the front windshield 10 to an inside of a vehicle compartment is perceived by the driver seated in the driver's seat. In addition, a light beam from the front scenery as a foreground landscape existing in front of the host vehicle, which has passed through the front windshield 10 made of light transparent glass, is also perceived by the driver seated in the driver's seat. As a result, the driver can visually recognize the virtual image 100 of the display image formed in front of the front windshield 10 which is superimposed on a part of the foreground landscape. That is, the HUD 250 superimposes and displays the virtual image 100 on the foreground landscape of the host vehicle to realize so-called AR (Augmented Reality) display.

A projection member on which the HUD 250 projects the displayed image may not be limited to the front windshield 10, and may be a light transmissive combiner or the like. Alternative to the HUD 250, a device that displays an image may be used as the display device 25. An example of the display device may be a combination meter, a CID (Center Information Display), and the like.

The HCU 20 is mainly configured by a microcomputer including a processor, a volatile memory, a nonvolatile memory, an I/O device, and a bus connecting these elements, and the HCU 20 is connected to the operation device 21, the microphone 22, the DSM 23, the biological sensor 24, and the display device 25 via the in-vehicle LAN. The HCU 20 controls virtual image display by the HUD 250 by executing a control program stored in the non-volatile memory. The HCU 20 corresponds to a display control device for a vehicle. The configuration of the HCU 20 relating to the control of virtual image display by the HUD 250 will be described in detail below.

Schematic Configuration of HCU 20

Figure 3:
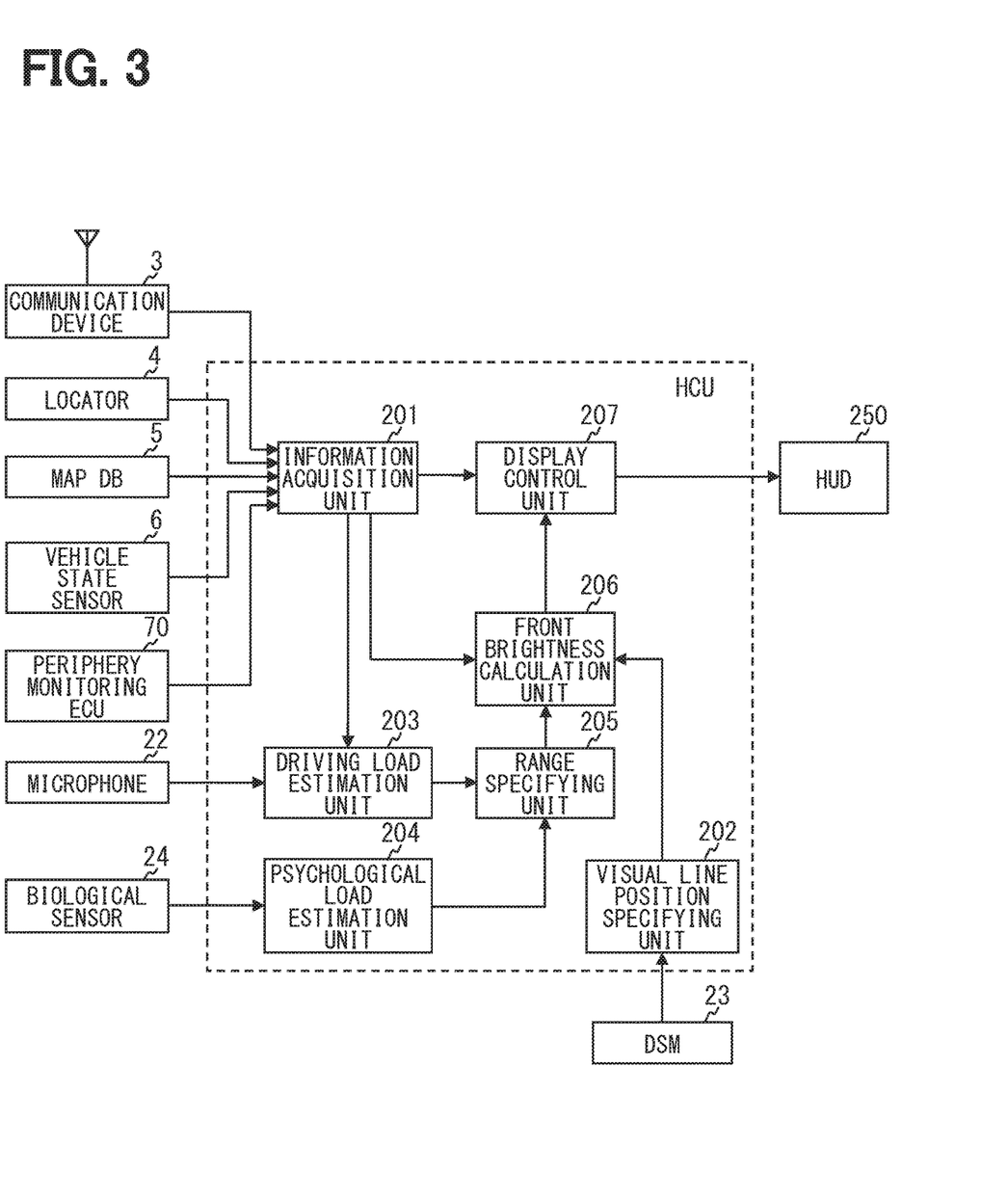
FIG. 3 is a diagram showing an example of a schematic configuration of an HCU 20.

Here, a schematic configuration of the HCU 20 will be described with reference to FIG. 3. Regarding control of virtual image display by the HUD 250, as shown in FIG. 3, the HCU 20 has functional blocks of an information acquisition unit 201, a visual line position specifying unit 202, a driving load estimation unit 203, a psychological load estimation unit 204, a range specifying unit 205, a front brightness calculation unit 206 and a display control unit 207. Some or all of the functions executed by the HCU 20 may be configured by hardware using one or more ICs or the like. Alternatively, some or all of the functional blocks of the HCU 20 may be implemented by a combination of software executed by a processor and hardware.

The information acquisition unit 201 acquires information necessary for display on the HUD 250 via the in-vehicle LAN. As an example, the necessary information includes the traffic information received from the center by the communication device 3, the vehicle position measured by the locator 4, the map data stored in the map DB 5, the detection result by the vehicle state sensor 6, the travelling environment of the host vehicle recognized by the periphery monitoring ECU 70, information of an image captured by the front camera 710 acquired by the periphery monitoring ECU 70, and the like.

The visual line specifying unit 202 specifies the visual line position in the foreground scenery of the driver of the host vehicle based on the information of the visual line direction detected by the DSM 23. The visual line position here is a position at which the driver visually confirms or gazes. The visual line position specifying unit 202 may be configured to specify the visual line position in the image captured by the front camera 710 (hereinafter referred to as a foreground image). As an example, the visual line position specifying unit 202 may use the correspondence relationship between the visual line direction detected by the DSM 23 and the visual line position in the foreground image, which is stored in advance in the non-volatile memory of the HCU 20, so that the unit 202 is configured to specify the visual line position in the foreground image. The visual line position in the foreground image may be specified by another method.

The driving load estimation unit 203 estimates the driving load of the driver of the host vehicle. The driving load estimation unit 203 may be configured to estimate the degree of the driving load by dividing the degree into more than two levels. Alternatively, in the following description, as an example of a configuration, the degree is divided into two levels whether the driving load is high or low. The term "driving load" as used herein means the load due to an action that the driver must handle during the driving operation.

The driving load estimation unit 203 may estimate the driving load according to the degree of congestion around the host vehicle. As an example, when the degree of congestion around the host vehicle is equal to or higher than a threshold, the unit 203 estimates that the driving load is high. For example, the driving load estimation unit 203 may specify the degree of congestion around the host vehicle based on the traffic information acquired by the information acquisition unit 201 via the communication device 3. In this case, the traffic information acquired via the communication device 3 corresponds to the congestion status information. Alternatively, the driving load estimation unit 203 may specify the degree of congestion around the host vehicle based on the number of vehicles around the host vehicle in the traveling environment of the host vehicle acquired by the information acquisition unit 201 from the periphery monitoring ECU 70. In this case, the information of the number of vehicles in the vicinity of the host vehicle detected by the periphery monitoring sensor 71 corresponds to the information of the congestion state. Further, the driving load estimation unit 203 may estimate the driving load according to the detection result of the vehicle state sensor 6 acquired by the information acquisition unit 201. As an example, when the speed of the host vehicle detected by the vehicle speed sensor is equal to or higher than the threshold, the unit 203 may estimate that the driving load is high.

Alternatively, the driving load estimation unit 203 may estimate the driving load according to the traveling environment of the host vehicle acquired from the periphery monitoring ECU 70. As an example, when the number of vehicles around the host vehicle is equal to or more than the threshold value, it may be estimated that the driving load is high. Alternatively, when a bicycle or a pedestrian is disposed along the route of the host vehicle, it may be estimated that the driving load is high, or when the distance between the host vehicle and the attention object such as the bicycle or pedestrian is equal to or smaller than a predetermined value, it may be estimated that the driving load is high. Alternatively, the driving load estimation unit 203 may estimate the driving load according to the road type of the traveling road of the host vehicle, the road shape, and the like. As an example, it may be estimated that the driving load is high when the host vehicle is traveling on a highway, or it may be estimated that the driving load is high when the host vehicle is traveling on a curved road.

Alternatively, the driving load estimation unit 203 may estimate the driving load according to the sound signal collected by the microphone 22. As an example, when the sound volume is equal to or higher than the threshold, it may be estimated that the driving load is high. Alternatively, when a sound corresponding to the sound of a siren of an emergency vehicle is detected by voice analysis, it may be estimated that the driving load is high.

The psychological load estimation unit 204 estimates the psychological load of the driver based on the biological information of the driver detected by the biological sensor 24. The psychological load estimation unit 204 may be configured to estimate the degree of the psychological load by dividing the degree into more than two levels. In the following description, as an example, it is estimated to divide into two levels whether the psychological load is high or not. The state in which the psychological load is high is, for example, a state corresponding to the height of the psychological load at which it is estimated that visual field narrowing occurs. The psychological load estimation unit 204 estimates that the psychological load is high when the value of the biological information such as the heart rate, the blood pressure, and the respiratory rate, which have a correlation that the value becomes higher according to the increase of the psychological load, is equal to or more than the threshold.

The range specifying unit 205 specifies a range estimated to be the range of the effective visual field of the driver (hereinafter referred to as effective visual range). The term "effective visual field" as used herein refers to a range in which things in the visual field range can be identified. As a default, a range in the foreground image corresponding to a rectangular range defined by about 30 degrees right-leftward, about 8 degrees upward, and about 12 degrees downward according to the view angle of the driver may be specified as the effective visual field range. This is merely an example, and a range in the foreground image corresponding to a circular range defined by about 5 to 7 degrees in the vertical and horizontal directions according to the view angle of the driver may be specified as the effective visual field range. The default effective visual field range may be another range as long as it is estimated to be the range of the effective visual field of the driver. As an example, as a default effective visual field range, a range in a foreground image for a general driver may be stored in advance in the non-volatile memory of the HCU 20.

Further, the range specifying unit 205 changes the effective visual range according to a factor that is estimated to affect the visual range of the driver of the host vehicle. This is because it is considered that the effective visual range of the driver while driving decreases as each load such as the speed of the vehicle, road conditions, visual load, auditory information, and other psychological factors increases, and the decrease of the effective visual range disappears when the load is dissolved. Therefore, the range specifying unit 205 corresponds to the range change unit.

The range specifying unit 205 may be configured to reduce the effective visual range from the default effective visual range when the driving load estimation unit 203 estimates that the driving load is high, or when the psychological load estimation unit 204 estimates that the psychological load is high. Therefore, the range specifying unit 205 changes the effective visual range to be narrower as the speed of the vehicle increases. In addition, the range specifying unit 205 changes the effective visual range to be narrower in accordance with the increase in the degree of congestion around the host vehicle, which is specified by the information on the congestion status around the vehicle. Further, the range specifying unit 205 changes the effective visual range to be narrower according to the increase in the driving load of the driver of the host vehicle estimated by the detection result of the periphery monitoring sensor 71. Further, the range specifying unit 205 changes the effective visual range to be narrower according to the increase in the driving load of the driver of the host vehicle estimated by the sound collection result of the microphone 22. Further, the range specifying unit 205 changes the effective visual range to be narrower according to the increase in the psychological load of the driver of the host vehicle estimated by the psychological load estimation unit 204.

The degree of reducing the effective visual field by the range specifying unit 205 may be a value corresponding to the degree to which the effective visual field is estimated to be reduced by the driving load and the psychological load.

The range specifying unit 205 may be configured to change the effective visual range to be narrower stepwisely in accordance with the increase in the number of types of loads satisfying the condition that the load is estimated to be high. The type of load described here may be a type that is classified into the driving load and the psychological load. Alternatively, the type may be further segmentalized into the speed of the vehicle, the degree of congestion around the host vehicle, the traveling environment of the vehicle, etc. Alternatively, when the load is estimated in more than two levels of whether the load is high or low by the driving load estimation unit 203 and the psychological load estimation unit 204, the effective visual range may be gradually narrowed in accordance with the degree of the load estimated by the highest degree among the types of loads.

The front brightness calculation unit 206 determines the effective visual range (hereinafter referred to as a brightness calculation range) with respect to the visual line position in the foreground image as the reference point according to the visual line position identified by the visual line position specifying unit 202 and the effective visual range specified by the range specifying unit 205. This brightness calculation range corresponds to the set range. Then, the front brightness calculation unit 206 calculates a representative value (hereinafter, front brightness) of the brightness in the determined brightness calculation range in the foreground image. Typical representative values include a mean value, a median value, a maximum value, a minimum value and the like.

Figure 4:
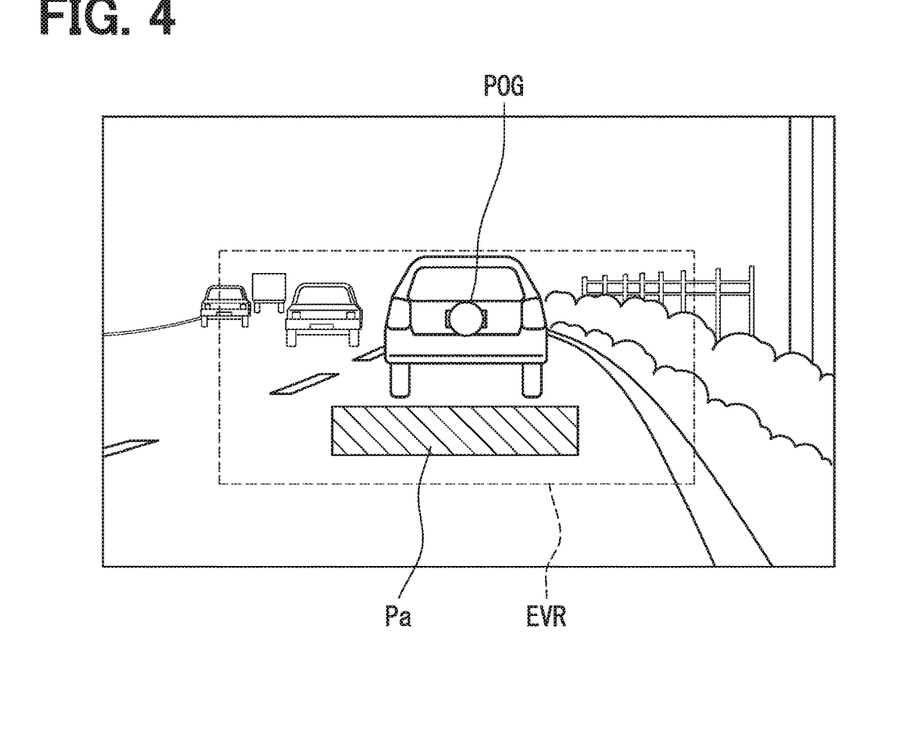
FIG. 4 is a diagram for explaining a brightness calculation range according to a load such as driving load and a psychological load.
Figure 5:
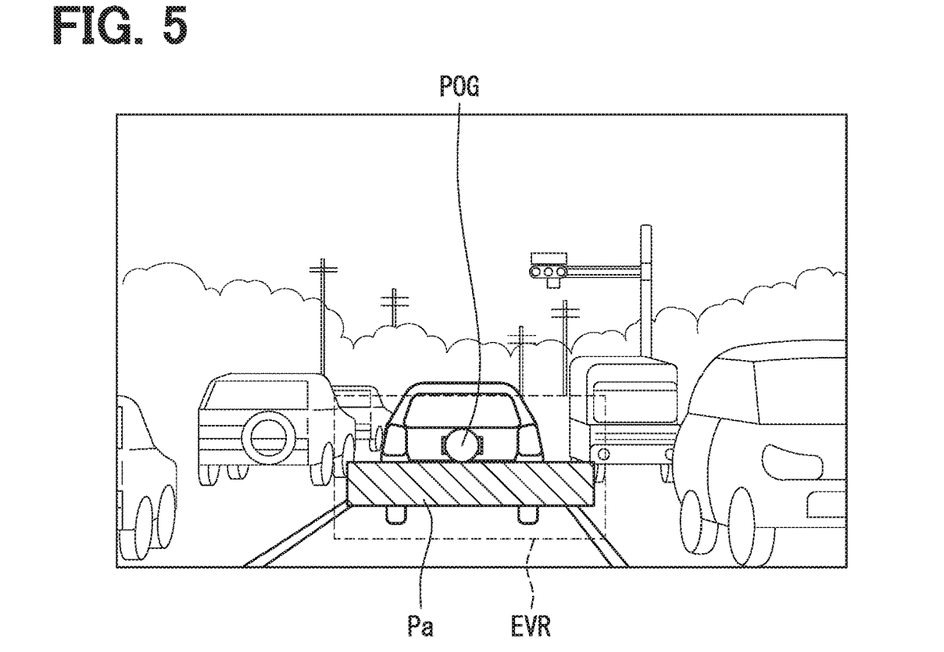
FIG. 5 is a diagram for explaining a brightness calculation range according to a load such as a driving load and a psychological load.

Here, the brightness calculation range according to the load such as the driving load and the psychological load will be described with reference to FIGS. 4 and 5. POG in FIG. 4 and FIG. 5 indicates the visual line position, Pa indicates the projection area, and EVR indicates the brightness calculation range. When neither the driving load estimation unit 203 nor the psychological load estimation unit 204 estimates that the load is high, as shown in FIG. 4, the default effective visual range with respect to the visual line position POG in the foreground image as the reference point is identified as the brightness calculation range EVR. On the other hand, when either of the driving load estimation unit 203 and the psychological load estimation unit 204 estimates that the load is high, as shown in FIG. 5, the brightness calculation range EVR is determined to be narrower than the default effective visual range.

The display control unit 207 sets the brightness of the display image to be projected on the projection area by the HUD 250 (hereinafter referred to as display image brightness) from the front front brightness calculated by the front brightness calculation unit 206. Then, the display image is displayed from the HUD 250 with the set display image brightness. As an example, the display control unit 207 is configured to set the display image brightness based on the front brightness with reference to the correspondence relationship between the front brightness and the display image brightness stored in advance in the non-volatile memory of HCU 20. The correspondence relationship between the front brightness and the display image brightness is a correspondence between the front brightness and the display image brightness such that the display image does not become too dazzled and too difficult to see. Further, the lower limit of the display image brightness is a value such that the display image is not too hard to see, and the upper limit of the display image brightness is a value such that the display image does not become too dazzled.

Virtual Image Display Control Related Process in HCU 20

Figure 6:
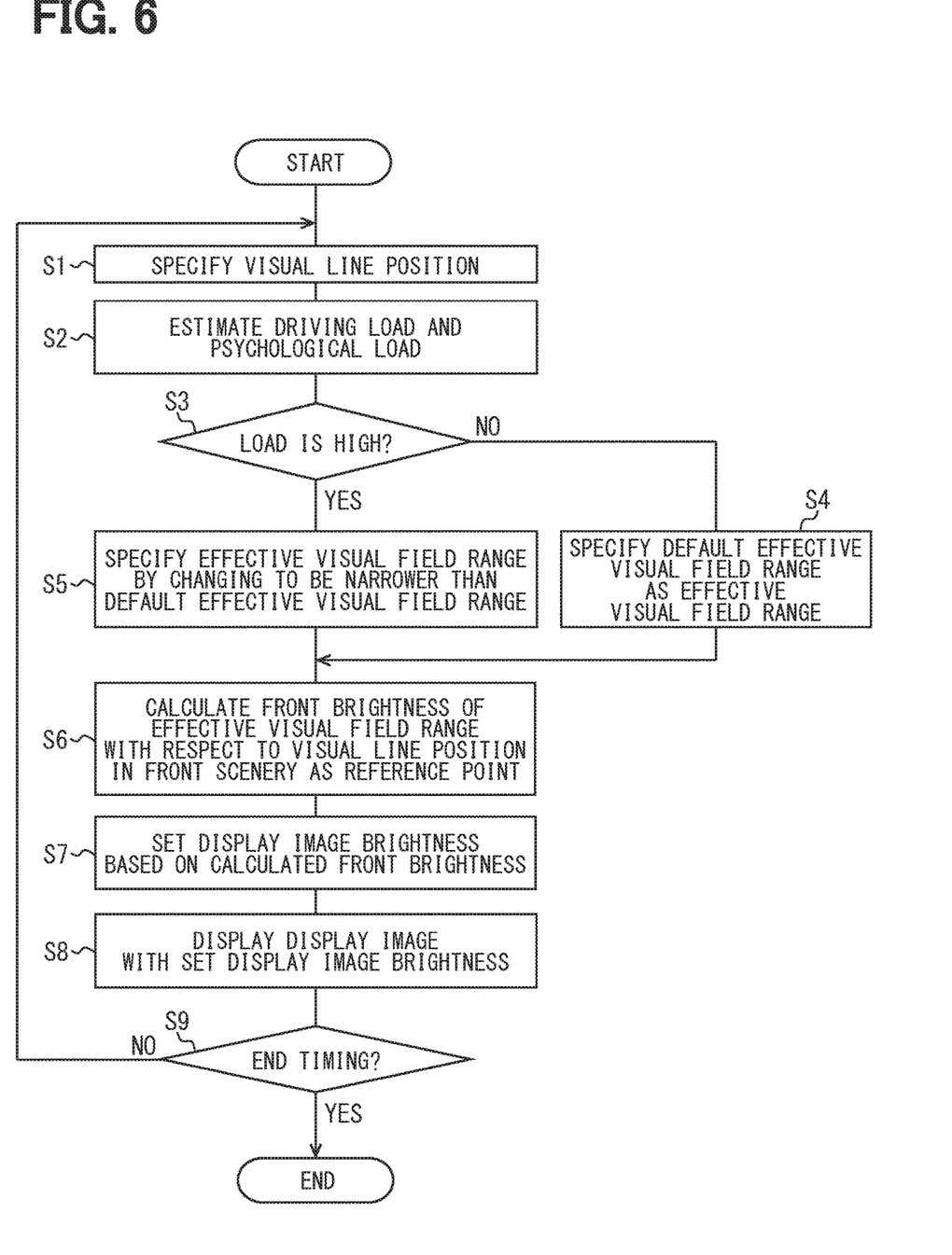
FIG. 6 is a flowchart showing an example of the flow of light adjustment related process in the HCU according to a first embodiment.

Subsequently, an example of the flow of processing (hereinafter, light adjustment related process) related to adjustment of the display image brightness by the HUD 250 in the HCU 20 in the first embodiment will be described using the flowchart in FIG. 6. The flowchart of FIG. 6 may be configured to be started when a power source of the HUD 250 turns on and a function of the HUD 250 is in operation. The function of the HUD 250 may be switched between an on state and an off state in accordance with an input operation received by the operation device 21. The power source of the HUD 250 may be switched between an on state and an off state in accordance with the on state and the off state of a switch (hereinafter referred to as a power switch) for starting an internal combustion engine or a motor generator of the host vehicle.

First, in step S1, the visual line position specifying unit 202 identifies the visual line position in the foreground scenery of the driver of the vehicle. In step S2, the driving load estimation unit 203 estimates the driving load of the driver of the host vehicle, and the psychological load estimation unit 204 estimates the psychological load of the driver of the host vehicle. In step S3, when at least one of the driving load estimation unit 203 and the psychological load estimation unit 204 estimates that a load is high (YES in S3), it moves to step S5. On the other hand, when neither the driving load estimation unit 203 nor the psychological load estimation unit 204 estimates that the load is high (NO in S3), the process proceeds to step S4.

In step S4, the range specifying unit 205 determines the default effective visual range as the effective visual range, and it proceeds to step S6. On the other hand, in step S5, the range specifying unit 205 determines the effective visual range changed to be narrower than the default effective visual range, and it proceeds to step S6. In step S6, the front brightness calculation unit 206 calculates the front brightness of the effective visual range based on the visual line position in the foreground image as the reference point according to the visual line position identified by the visual line position specifying unit 202 and the effective visual range specified by the range specifying unit 205.

In step S7, the display control unit 207 sets the display image brightness from the front brightness calculated in S6, and it proceeds to step S8. In step S8, when the display control unit 207 controls the HUD 250 to display a display image, the display control unit 207 controls to display the display image with the display image brightness set in step S7. In step S9, when it is the end timing of the light adjustment related process (YES in S9), the light adjustment related process ends. On the other hand, when it is not the end timing of the light adjustment related process (NO in S9), the process returns to S1 to repeat the process. Examples of the end timing of the light adjustment related process may include a timing when the power switch of the host vehicle turns off, a timing when the function of the HUD 250 is in the off state, and the like.

Here, since the process of this flowchart is repeated until the end timing of the light adjustment related process, when both the driving load estimation unit 203 and the psychological load estimation unit 204 no longer estimate that the load is high after changing the effective visual range to be narrower than the default effective visual range in a case where either the driving load estimation unit 203 or the psychological load estimation unit 204 estimates that the load is high, the once narrowed effective visual range is returned to the default effective visual range. That is, the range specifying unit 205 changes the set range to be narrower in accordance with the increase in the driving load and/or the psychological load of the driver of the host vehicle, and the range specifying unit 205 changes the set range to be wider in accordance with the decrease in the driving load and/or the psychological load of the driver of the host vehicle.

Summary of First Embodiment

According to the configuration of the first embodiment, the display image brightness of the display image to be superimposed and displayed as a virtual image on the foreground scenery of the vehicle by the HUD 250 is adjustable according to the front brightness of the effective visual field range with respect to the driver's visual line position. Therefore, it is possible to display a display image with the display image brightness that is easily viewable according to the brightness of the range of the effective visual field of the driver. As a result, the virtual image display by the head-up display is displayed more easily visible for the driver.

Further, according to the configuration of the first embodiment, when it is estimated that either the driving load or the psychological load is high, the range of the effective visual field for calculating the front brightness to adjust the display image brightness is narrowed. Therefore, it is possible to change the range of the effective visual field for calculating the front brightness to be narrower in accordance with the visual range which becomes narrow due to the driving load and the psychological load. Therefore, it is possible to display the virtual image by the head-up display more easily visible to the driver according to a change in the visual range due to the driving load and the psychological load.

Second Embodiment

Although the display control unit 207 sequentially adjusts the display image brightness when displaying by the HUD 250 in the first embodiment, the feature is not limited thereto. For example, the display control unit 207 may start adjusting the display image brightness only in a predetermined situation. Hereinafter, a second embodiment of the present disclosure will be described.

The vehicle system 1 of the second embodiment is similar to the vehicle system 1 of the first embodiment except that a part of the light adjustment related process in the HCU 20 is different. Here, an example of the flow of the light adjustment related process in the HCU 20 according to the second embodiment will be described using the flowchart of FIG. 7. Also in the flowchart of FIG. 7, similarly to the flowchart of FIG. 6, the process starts when the power source of the HUD 250 turns on, and the function of the HUD 250 is in operation.

Figure 7:
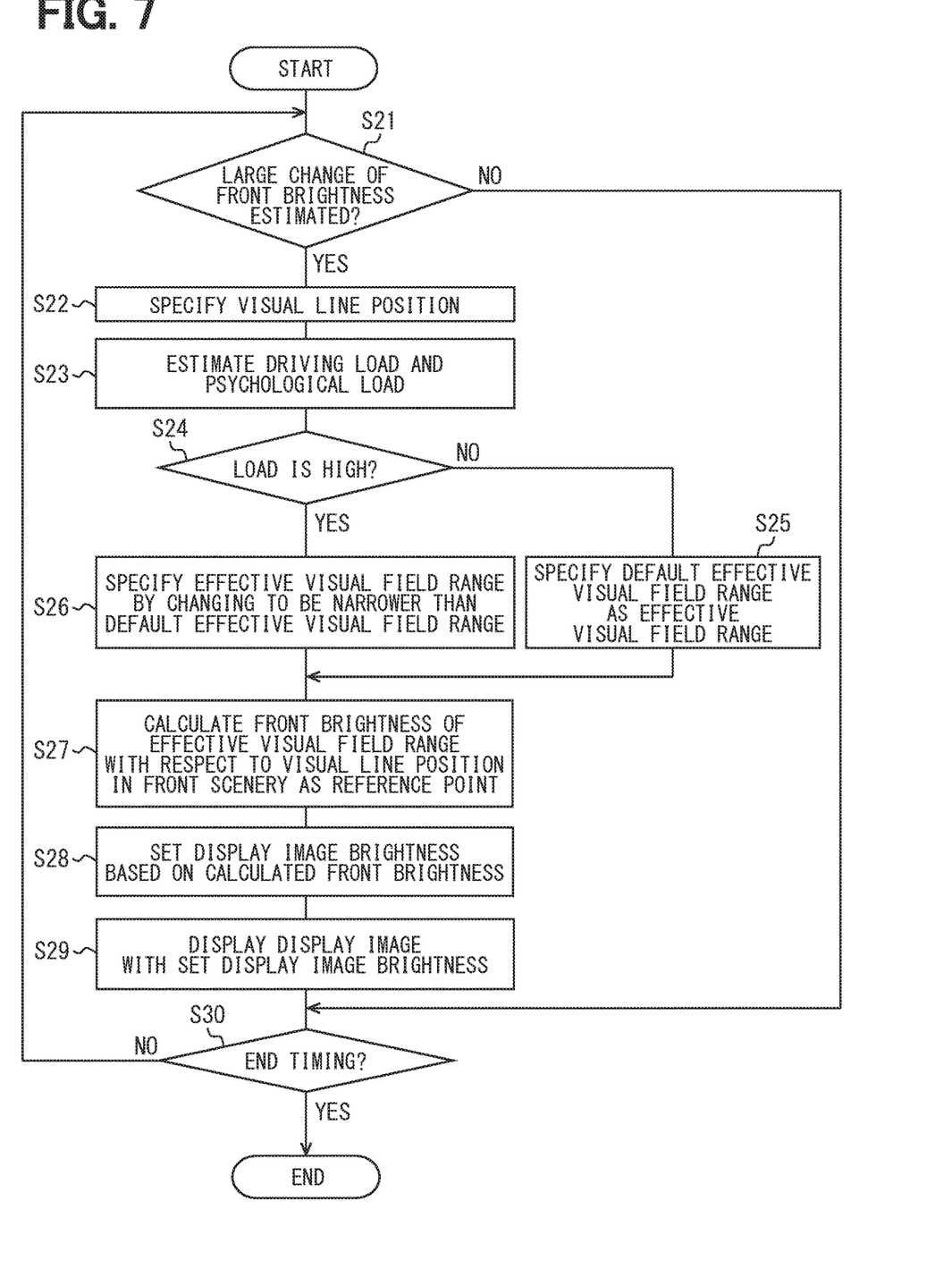
FIG. 7 is a flowchart showing an example of the flow of light adjustment related process in the HCU according to a second embodiment.

First, in step S21, when it is estimated that the brightness in the foreground scenery changes significantly (YES in S21), the process proceeds to step S22. On the other hand, when it is not estimated that the brightness in the foreground scenery changes significantly (NO in S21), the process moves to step S30. The HCU 20 may be configured to estimate whether the brightness in the foreground scenery changes significantly, based on the vehicle position of the vehicle and map data. The vehicle position measured by the locator 4 may be used as a vehicle position, and the map data stored in the map DB 5 may be used as map data. As an example, the HCU 20 estimates that the brightness in the foreground scenery changes significantly when the vehicle enters a section where natural light is largely blocked. As a section where natural light is greatly blocked, there is a section surrounded by a tunnel, a building and the like. Here, the present features may not be limited to the configuration in which the brightness in the foreground scenery is estimated to change significantly based on the map data. Alternatively, the brightness in the foreground scenery may be estimated to change significantly according to other information such as weather information.

The process of steps S22 to S29 are similar to the process of S1 to S8 of the first embodiment. In step S30, when it is the end timing of the light adjustment related process (YES in S30), the light adjustment related process ends. On the other hand, when it is not the end timing of the light adjustment related process (NO in S30), the process returns to S21 to repeat the process.

According to the configuration of the second embodiment, the adjustment of the display image brightness starts when it is estimated that the brightness in the foreground scenery changes significantly. Thus, in addition to the effects of the first embodiment, it is possible to reduce the process load for sequentially adjusting the display image brightness even when the brightness in the foreground scenery does not change much.

Third Embodiment

Depending on the content of the display image to be displayed, the display control unit 207 may be configured to prioritize increasing the brightness of the display image rather than adjusting the display image brightness according to the front brightness (hereinafter, in a third embodiment). Hereinafter, the third embodiment of the present disclosure will be described.

The vehicle system 1 of the third embodiment is similar to the vehicle system 1 of the first embodiment except that a part of the light adjustment related process in the HCU 20 is different. Here, an example of the flow of the light adjustment related process in the HCU 20 according to the second embodiment will be described using the flowchart of FIG. 7. Also in the flowchart of FIG. 8, similarly to the flowchart of FIG. 6, the process starts when the power source of the HUD 250 turns on, and the function of the HUD 250 is in operation.

Figure 8:
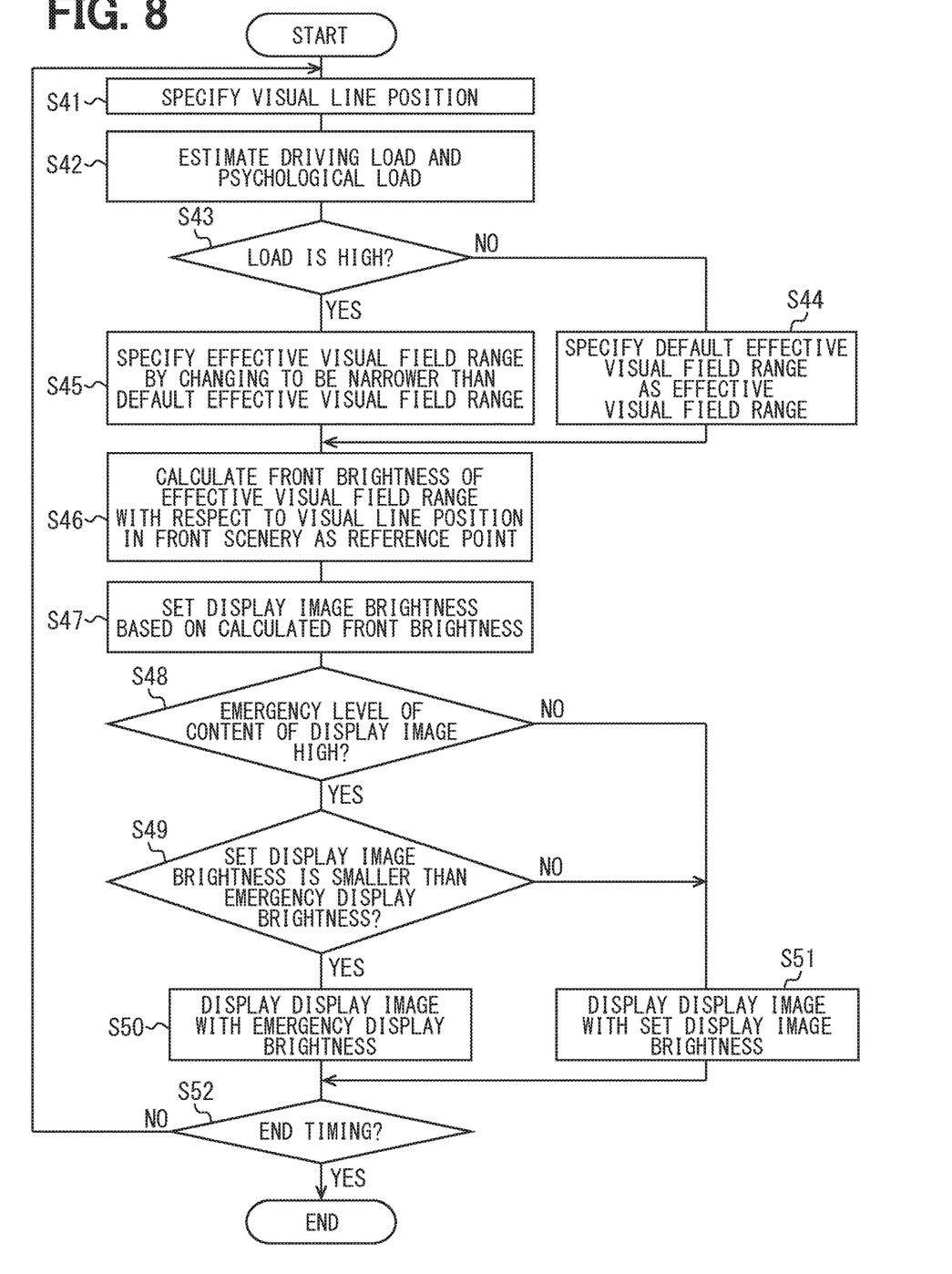
FIG. 8 is a flowchart showing an example of the flow of light adjustment related process in the HCU according to the third embodiment.

The process of steps S41 to S47 are similar to the process of S1 to S7 of the first embodiment. In step S48, the display control unit 207 determines whether the urgency of the content of the display image to be displayed by the HUD 250 is high. The type of the display image with high urgency may be registered in advance in the HCU 20 so that the display control unit 207 can distinguish the display image with high urgency. As an example of the display image with high urgency, there are a display image for notifying the approach of the emergency vehicle, a display image for notifying the approach of an obstacle such as a pedestrian, and the like. Then, when the display control unit 207 determines that the urgency of the content of the display image is high (YES in S48), the process proceeds to step S49. On the other hand, when it is determined that the urgency of the content of the display image is not high (NO in S48), the process proceeds to step S51.

In step S49, when the display image brightness according to the front brightness set in S47 is less than the emergency display brightness (YES in S49), the process proceeds to step S50. On the other hand, when it is equal to or higher than the emergency display brightness (NO in S49), the process proceeds to step S51. The emergency display brightness is brightness defined as the display image brightness when displaying a display image with high urgency, and is the brightness for the purpose of enhancing the visibility of the display image. The emergency display brightness corresponds to the specific value.

In step S50, the display image to be displayed by the HUD 250 is displayed with the emergency display brightness, and the process proceeds to step S52. On the other hand, in step S51, the display image to be displayed by the HUD 250 is displayed with the display image brightness according to the front brightness set in S47, and the process proceeds to step S52. In step S52, when it is the end timing of the light adjustment related process (YES in S52), the light adjustment related process ends. On the other hand, when it is not the end timing of the light adjustment related process (NO in S52), the process returns to S41 to repeat the process.

According to the configuration of the third embodiment, when displaying a display image with high urgency, the priority is given to raising to the emergency display brightness rather than adjustment to the display image brightness according to the front brightness. Thus, in addition to the effect in the first embodiment, it is possible to give the priority for the driver to notice more easily the display image having high urgency. The second embodiment and the third embodiment may be combined.

First Modification

Although the above-mentioned embodiment showed the feature which uses both the driving load estimated by driving load estimation unit 203 and the psychological load estimated by psychological load estimation unit 204, it may not necessarily restrict to this feature. For example, only one of them may be used.

Second Modification

In the above-described embodiment, the configuration is described in which the driving load is estimated according to the speed of the vehicle, the degree of congestion around the vehicle, the detection result of the periphery monitoring sensor 71, and the sound collection result of the microphone 22. It may not necessarily restrict to this feature. For example, a part of them may be used.

Third Modification

Although the above-mentioned embodiment shows a feature in which the range specifying unit 205 specifies an effective visual range according to the driving load estimated by the driving load estimation unit 203, it may not necessarily restrict to this feature. For example, the effective visual range may be specified according to a degree of the state such as the speed of the vehicle and the degree of congestion around the vehicle without estimating the driving load.

Fourth Modification

Alternatively, the range specifying unit 205 may be configured not to change the effective visual range according to the driving load, the psychological load, and the like.

Fifth Modification

In the above-described embodiment, although the range which is estimated as the range of the effective visual field of the driver is set to be the range which provides to compute the front brightness, it may not necessarily restricted to this feature. For example, a range estimated to be the visual range which is a range within the field of view of the driver may be set as a range for calculating the front brightness. Alternatively, a range based on the driver's visual line position as a reference position such a range estimated to be an effective visual range and a range estimated to affect the visibility of the display image by the HUD 250 other than the range estimated to be a visual range may be adopted to the range for calculating the front brightness.

Here, the process of the flowchart or the flowchart described in this application includes a plurality of sections (or steps), and each section is expressed as, for example, S1. Further, each section may be divided into several subsections, while several sections may be combined into one section. Furthermore, each section thus configured may be referred to as a device, module, or means.

Although the present disclosure has been described in accordance with the example embodiments, it is understood that the disclosure is not limited to such example embodiments or structures. The present disclosure covers various modification examples and modifications within equivalent scopes. Furthermore, various combinations and formations, and other combinations and formations including one or more than one or less than one element may be included in the scope and the spirit of the present disclosure.

What is claimed is:

1. A vehicle display control device for controlling a display image brightness, which is a brightness of a display image of a head-up display that displays and superimposes the display image as a virtual image over a foreground scenery of a vehicle by projecting the display image on a projection member, the vehicle display control device comprising:
    a visual line position specifying unit for specifying a visual line position of a driver of the vehicle, the visual line position comprising a position at which the driver gazes;
    a display control unit for adjusting the display image brightness of the head-up display to be within a set range that is based on the visual line position; and
    a range change unit that changes the set range according to a visual range of the driver of the vehicle, wherein:
    the set range is an effective visual range which is a part of the visual range; and
    an object is identifiable in the effective visual range.

2. The vehicle display control device according to claim 1, wherein:
    the display control unit adjusts the display image brightness by setting a range, estimated to correspond to the visual range, to be the set range.

3. The vehicle display control device according to claim 2, wherein:
    the display control unit adjusts the display image brightness by setting a range, estimated to correspond to the effective visual range, to be the set range.

4. The vehicle display control device according to claim 1, wherein:
    the range change unit changes the set range to be narrower as a driving load of the driver of the vehicle becomes larger.

5. The vehicle display control device according to claim 4, wherein:
    the range change unit changes the set range to be narrower as a speed of the vehicle becomes higher.

6. The vehicle display control device according to claim 4, wherein:

the range change unit changes the set range to be narrower as a degree of congestion around the vehicle specified based on information of a congestion status around the vehicle becomes larger.

7. The vehicle display control device according to claim 4, wherein:
the range change unit changes the set range to be narrower as the driving load of the driver of the vehicle, estimated from a detection result of a periphery monitoring sensor that detects an obstacle around the vehicle, becomes higher.

8. The vehicle display control device according to claim 4, wherein:
the range change unit changes the set range to be narrower as the driving load of the driver of the vehicle, estimated from a sound collection result of a sound collection device that collects sound of at least one of an inside of a vehicle compartment of the vehicle and a periphery of the vehicle, becomes higher.

9. The vehicle display control device according to claim 4, further comprising:
a psychological load estimation unit that estimates a psychological load of the driver of the vehicle, wherein:
the range change unit changes the set range to be narrower as the psychological load of the driver of the vehicle estimated by the psychological load estimation unit becomes higher.

10. The vehicle display control device according to claim 1, wherein:
the display control unit sequentially adjusts the display image brightness according to the set range when the head-up display displays the display image.

11. A vehicle display control device for controlling a display image brightness, which is a brightness of a display image of a head-up display that displays and superimposes the display image as a virtual image over a foreground scenery of a vehicle by projecting the display image on a projection member, the vehicle display control device comprising:
a visual line position specifying unit for specifying a visual line position of a driver of the vehicle, the visual line position comprising a position at which the driver gazes; and
a display control unit for adjusting the display image brightness of the head-up display to be within a set range that is based on the visual line position as a reference point, wherein:
the display control unit starts to adjust the display image brightness according to the brightness in the set range in the foreground scenery with the visual line position as the reference point when it is estimated that the brightness in the foreground scenery changes significantly;
the set range is an effective visual range which is a part of a visual range of the driver of the vehicle; and
an object is identifiable in the effective visual range.

12. A vehicle display control device for controlling a display image brightness as a brightness of a display image of a head-up display that displays and superimposes the display image as a virtual image over a foreground scenery of a vehicle by projecting the display image on a projection member, the vehicle display control device comprising:
a visual line position specifying unit for specifying a visual line position of a driver of the vehicle; and
a display control unit for adjusting the display image brightness in accordance with the brightness in a set range based on the visual line position as a reference point, wherein:
when the display control unit displays the display image indicating a type of information with high urgency, the display control unit prioritizes increasing the display image brightness up to a predetermined value for increasing a visibility of the display image over adjusting the display image brightness according to the brightness in the set range in the foreground scenery with the visual line position as the reference point.

13. The vehicle display control device according to claim 12, further comprising:
a range change unit configured to change the set range to be narrower as a driving load of the driver of the vehicle becomes larger.

14. The vehicle display control device according to claim 13, wherein:
the range change unit changes the set range to be narrower as a speed of the vehicle becomes higher.

15. The vehicle display control device according to claim 13, wherein:
the range change unit changes the set range to be narrower as a degree of congestion around the vehicle specified based on information of a congestion status around the vehicle becomes larger.

16. The vehicle display control device according to claim 13, wherein:
the range change unit changes the set range to be narrower as the driving load of the driver of the vehicle, estimated from a detection result of a periphery monitoring sensor that detects an obstacle around the vehicle, becomes higher.

17. The vehicle display control device according to claim 13, wherein:
the range change unit changes the set range to be narrower as the driving load of the driver of the vehicle, estimated from a sound collection result of a sound collection device that collects sound of at least one of an inside of a vehicle compartment of the vehicle and a periphery of the vehicle, becomes higher.

18. The vehicle display control device according to claim 13, further comprising:
a psychological load estimation unit that estimates a psychological load of the driver of the vehicle, wherein:
the range change unit changes the set range to be narrower as the psychological load of the driver of the vehicle estimated by the psychological load estimation unit becomes higher.

19. A vehicle display control device for controlling a display image brightness, which is a brightness of a display image of a head-up display that displays and superimposes the display image as a virtual image over a foreground scenery of a vehicle by projecting the display image on a projection member, the vehicle display control device comprising:
a visual line position specifying unit for specifying a visual line position of a driver of the vehicle, the visual line position comprising a position at which the driver gazes;
a display control unit for adjusting the display image brightness of the head-up display to be within a set range that is based on the visual line position; and
a range change unit that changes the set range according to a visual range of the driver of the vehicle, wherein:

the set range is an effective visual range which is a part of the visual range;

an object is identifiable in the effective visual range; and the range change unit changes the set range to be narrower as a driving load of the driver of the vehicle becomes larger.

20. A vehicle display control device for controlling a display image brightness, which is a brightness of a display image of a head-up display that displays and superimposes the display image as a virtual image over a foreground scenery of a vehicle by projecting the display image on a projection member, the vehicle display control device comprising:

a visual line position specifying unit for specifying a visual line position of a driver of the vehicle, the visual line position comprising a position at which the driver gazes; and a display control unit for adjusting the display image brightness of the head-up display to be within a set range that is based on the visual line position, wherein:

the display control unit starts to adjust the display image brightness according to the brightness in the set range in the foreground scenery with the visual line position as a reference point when it is estimated that the brightness in the foreground scenery changes significantly;

the set range is an effective visual range which is a part of a visual range of the driver of the vehicle;

an object is identifiable in the effective visual range; and the vehicle display control device further comprising a range change unit configured to change the set range to be narrower as a driving load of the driver of the vehicle becomes larger.

* * * * *